(12) United States Patent
Ye et al.

(10) Patent No.: US 7,866,814 B2
(45) Date of Patent: Jan. 11, 2011

(54) TORIC LENS DESIGN

(75) Inventors: Ming Ye, Fort Worth, TX (US); Curtis Dean McKenney, Duluth, GA (US)

(73) Assignee: Novartis AG, Basel (CH)

( * ) Notice: Subject to any disclaimer, the term of this patent is extended or adjusted under 35 U.S.C. 154(b) by 10 days.

(21) Appl. No.: 12/351,482

(22) Filed: Jan. 9, 2009

(65) Prior Publication Data

US 2009/0115963 A1 May 7, 2009

Related U.S. Application Data

(63) Continuation of application No. 11/359,641, filed on Feb. 22, 2006, now Pat. No. 7,475,983.

(60) Provisional application No. 60/655,964, filed on Feb. 23, 2005.

(51) Int. Cl.
*G02C 7/04* (2006.01)
(52) U.S. Cl. .............................. 351/160 H; 351/160 R; 351/177

(58) Field of Classification Search ............. 351/160 H, 351/160 R, 161, 177
See application file for complete search history.

(56) References Cited

U.S. PATENT DOCUMENTS

| 5,020,898 A | 6/1991 | Townsley |
| 6,467,903 B1 | 10/2002 | Back |
| 6,595,640 B1 | 7/2003 | Jubin |

FOREIGN PATENT DOCUMENTS

| WO | 2004/011989 A1 | 2/2004 |
| WO | 2004/015480 A1 | 2/2004 |

OTHER PUBLICATIONS

International Search Report for PCT/EP2006/001549 May 26, 2006.

*Primary Examiner*—Scott J Sugarman
(74) *Attorney, Agent, or Firm*—Robert Ambrose

(57) ABSTRACT

This invention is related to contact lenses. In particular, the present invention is related to a toric contact lens design with thickness zones in the carrier portion of the lens for increased rotational stability.

44 Claims, 6 Drawing Sheets

TORIC LENS DESIGN

This application is a continuation of U.S. non-provisional patent application No. 11/359,641, filed Feb. 22, 2005, claims the benefit under 35 USC §119 (e) of U.S. provisional application No. 60/655,964, filed Feb. 23, 2005, incorporated by reference in its entirety.

This invention is related to contact lenses. In particular, the present invention is related to a toric contact lens design with thickness zones in the carrier portion of the lens for increased rotational stability.

BACKGROUND

Contact lenses are widely used for correcting many different types of vision deficiencies. These include defects such as near-sightedness and far-sightedness (myopia and hypermetropia, respectively), astigmatism vision errors, and defects in near range vision usually associated with aging (presbyopia).

Astigmatism is optical power meridian-dependent refractive error in an eye. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although this may be worse at distance or near, depending on the type of astigmatism. These people may complain of sore eyes and headaches associated with demanding visual tasks. Astigmatism can be corrected with an astigmatic ophthalmic lens, which usually has one spherical surface and one toroidal (cylindrical) surface.

Because toric lenses have a cylindrical surface, orientation of the lens is of particular importance. Hence, most contact lenses have one or more orientation features that provide a predetermined orientation on the eye. Typical orientation features include two thin zones at the top and bottom of the lens as well as prism ballast.

The present invention seeks to correct the inadequacies of the prior art

SUMMARY OF THE INVENTION

In accomplishing the foregoing, there is provided, in accordance with one aspect of the present invention, a toric contact lens having multiple zones in the carrier portion of the lens for increased rotational stability.

One embodiment of the present invention includes a toric contact lens design with a central optical zone, a vertical meridian, a carrier extending from the central optical zone, and a plurality of thickness zones that are designed to achieve rotational stability. The present invention may have one or more transition zones. In one embodiment, a transition zone may be located between the central optical zone 1 and the carrier. In another embodiment, a transition zone may be located between the carrier and the lens edge. In a related embodiment, two transition zones may be present; one located between the central optical zone 1 and the carrier and another located between the carrier and the lens edge.

In another embodiment, the toric contact lens design includes three thickness zones. In a related embodiment, each thickness zone may have two boundaries. In a related embodiment, the second zone is preferably symmetrical across the vertical meridian on the sides of the lens. In still another embodiment, the first and third thickness zones may be at the top and bottom of the lens design. In one embodiment of the present invention, the boundary between the first and second zones is about 15 degrees from the vertical meridian.

In another embodiment, the boundary is about 25 degrees from the vertical meridian. In still another embodiment, the boundary is about 45 degrees from the vertical meridian.

The thickness profiles of the present invention are preferably measured along angular meridians. In one embodiment, the thickness profile of the second zone increases from its upper boundary to its lower boundary. In a related embodiment, the slope of the thickness profile of the second thickness zone may be a linear function, which may be constant or have a positive or negative slope. In another embodiment, the slope of the thickness profile of the second thickness zone may be a step function. In still another embodiment, the slope of the thickness profile of the second thickness zones may also gradually increase and subsequently decrease from the upper boundary to the lower boundary. At each angular meridian within the second thickness zone, there is a relatively consistent thickness section. The width of the section may be at least 30% of the zone width. The thickness profile of the second zone may have a range from the upper boundary to the lower boundary of about 0.065 mm to about 0.45 mm. In a more preferred embodiment, the thickness range may be from about 0.140 mm to about 0.340 mm.

The present invention may allow the same carrier to be used for different optical zones on different lenses. The present invention may also include lenses having the designs disclosed herein. Such lenses are preferably soft lenses These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the manufacturing procedures are well known and commonly employed in the art. Conventional methods are used for these procedures, such as those provided in the art and various general references. Where a term is provided in the singular, the inventors also contemplate the plural of that term.

In one embodiment, the present invention provides a toric contact lens design. The toric contact lens of the present invention has a concave back surface (posterior surface) and a convex front surface (anterior surface). The front surface preferably consists of a center optical zone, a transition zone, and a peripheral carrier. In a preferred embodiment, a rotational stability feature is included in the peripheral carrier. The peripheral carrier is preferably divided into multiple stability or thickness zones.

In an alternative embodiment, the toric and/or aberration correction in the central optical zone may be on the posterior surface. In still another embodiment, the optics in the central optical zone may be split between the anterior and posterior surfaces of the lens. For example the toric optics may be located in the anterior surface whereas, for example, progressive optics (for presbyopia) may be located on the posterior surface.

Figure 1A:
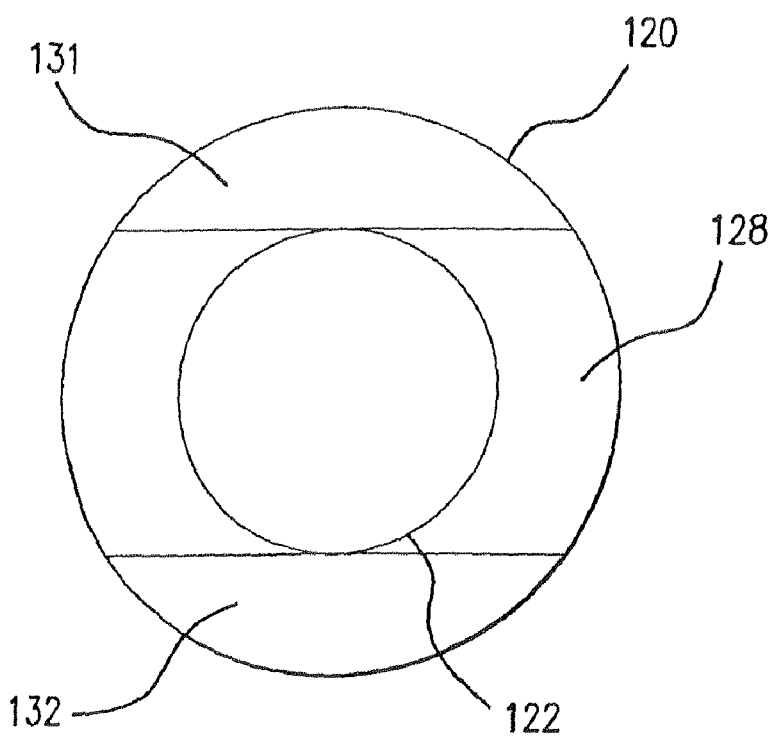
FIG. 1A schematically shows the components of a basic toric lens design.
Figure 1B:
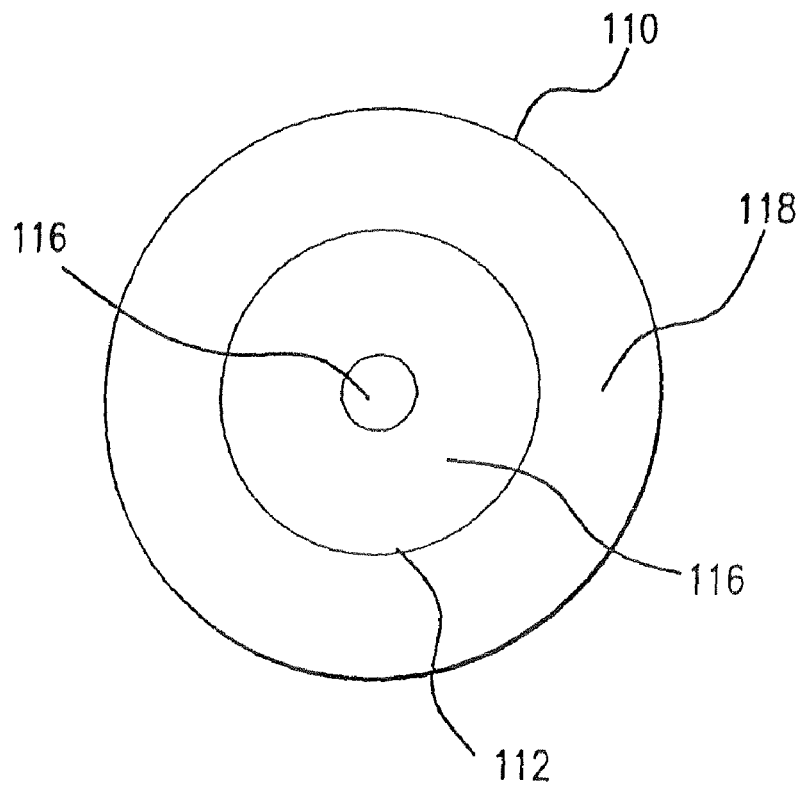
FIG. 1B schematically shows the components of a basic toric lens design.

FIG. 1 schematically shows a typical toric contact lens according to a preferred embodiment of the invention. The toric contact lens 100 may have a diameter about 14.5 mm. The toric contact lens 100 preferably has a concave (or posterior) surface 110 and an opposite convex (or anterior) surface 120, and a central axis passing through the apex of the convex (anterior) surface.

The convex surface 120 comprises a central optical zone 122, which is circular in shape and is substantially concentric with a central axis, and a non-optical peripheral zone or carrier 128.

The central optical zone 122 is a toroidal surface and has a diameter of about 8 mm. The toroidal surface is formed by defining a curve in the Y-Z plane, wherein the Z-axis coincides with or is parallel to the central axis of the lens, and then rotating this curve around an axis parallel to the Y-axis from a distance r the value of which is selected to impart a desired cylindrical optical power to the contact lens for correcting astigmatism errors of an eye.

Figure 2:
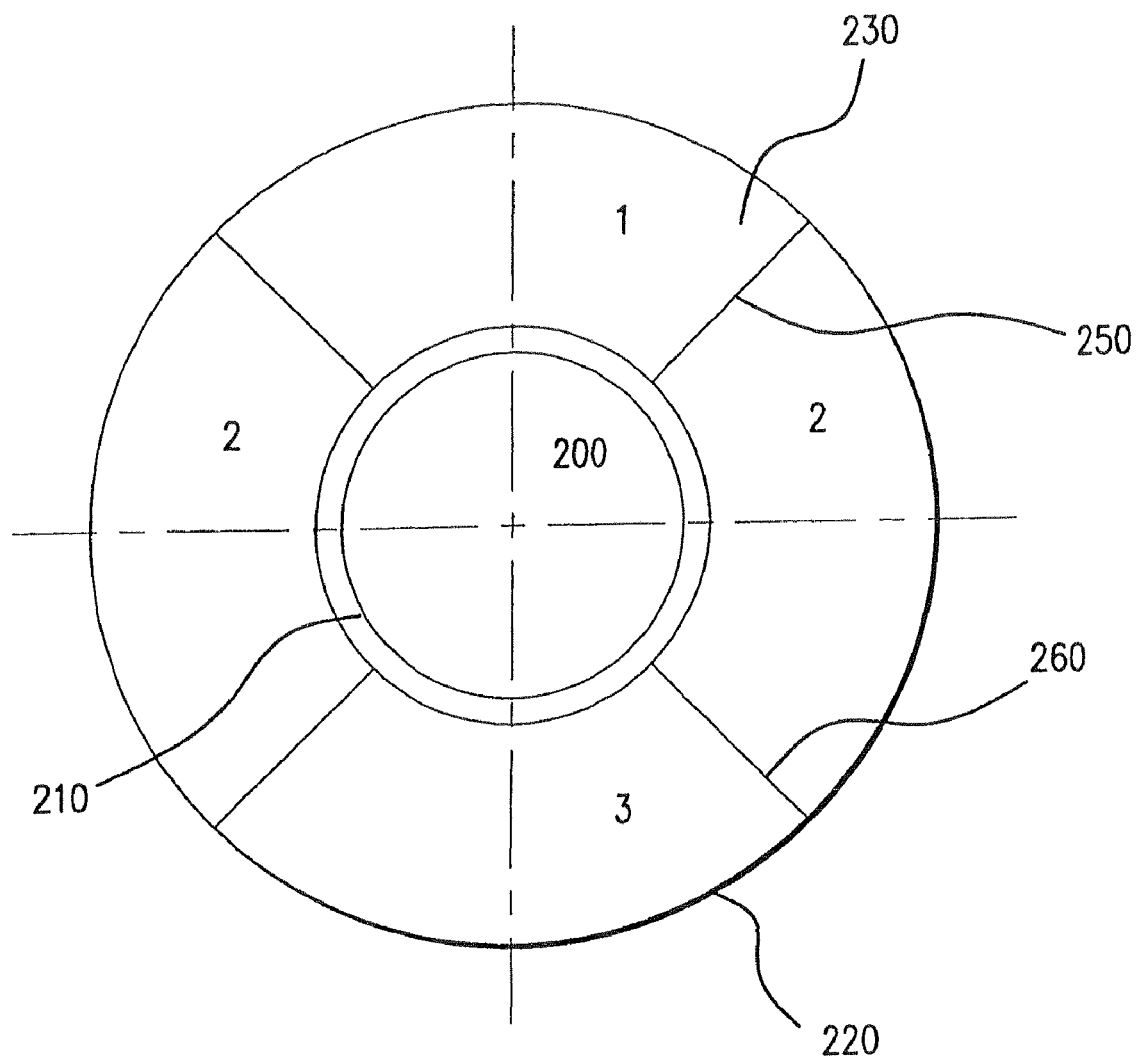
FIG. 2 depicts a lens with multiple zones in the carrier according to a preferred embodiment of the invention.

FIG. 2 depicts the zones used in the present invention to provide stability on the front surface of a lens. The carrier 10 may be divided into three zones (1, 2, and 3). Additionally, this same configuration may be considered to have 4 zones as zone 2 may be considered as two zones, as the entire area shown in FIG. 2 is not continuous. In a preferred embodiment, zone 1 is preferably located towards the top of the lens and has the minimum thickness found in carrier 230. Zone 1 is preferably symmetrical about the vertical meridian. Zone 2 is located beneath zone 1 on opposite sides (left and right sides) of the optical zone 1 and extends between zone 1 and zone 3. Zone 2 is preferably a prism zone with greater thickness and borders 250 and 260. The thickness of zone 2 preferably increases along the angular meridians, reaching a zone maximum towards the bottom border 260. The right and left sections of zone 2 are preferably mirrored along the vertical meridian.

Zone 3 is preferably a weight balance zone that has a larger mass than zone 1. The thickness profile of zone 3 along the vertical axis is preferably similar to conventional prism ballast toric lenses. In some embodiments the thickness profile may be thinner than conventional prism ballast toric lenses.

The central portion of the lens, or optical zone 200 is created using ordinary methods known in the art. In one embodiment, there is a transition zone 210 between the optical zone and the carrier. In a related embodiment, the may be a second transitional zone near the lens edge 220. In another embodiment, the lens is designed such that a transition zone is not present. Additionally, a transition zone may not be present at or near lens edge 220 but rather, carrier portion 230 of the lens may extend to the edge of the lens.

The present invention defines thickness along slices called meridians. Many inventions, such as those disclosed in U.S. Pat. No. 6,467,903 use meridians that are horizontal slices to define thickness. In the context of the present invention, thickness is preferably defined along radial or angular meridians that radiate from the central zone.

Referring back to FIG. 2, zones 1, 2, & 3 may be defined by radial boundaries. For example, the boundary line between zones 1 & 2 may be located about 15 degrees from the vertical meridian as measured from the top of the lens. In another embodiment, the boundary line between zones 1 & 2 may be about 45 degrees from the vertical meridian. In one embodiment, the boundary line between zones 2 & 3 may be approximately 30 degrees from the vertical meridian as measured from the bottom of the lens. In still another embodiment of the present invention, the boundary line between zones 2 and 3 is about 60 degrees as measured from the bottom of the lens.

In still another embodiment, the zones may be defined by angles. In this embodiment, if the vertical meridian is used as a reference, with 12 o'clock defined as 0 degrees, the right side of zone 2, as shown in FIG. 2, can be defined between about 15 degrees (upper boundary) and about 150 degrees (lower boundary). In a preferred embodiment, the right side of zone 2 can be defined between about 45 degrees (upper boundary and about 120 degrees (lower boundary). The lens thickness is preferably greatest near or at the borders between zones 2 and 3 as shown in the graphs depicted in FIG. 3. In one embodiment, the thickness range of zones 2 may be from about 0.065 mm to about 0.45 mm. In a preferred embodiment, the thickness range may be from about 0.140 mm to about 0.340 mm.

Figure 3:
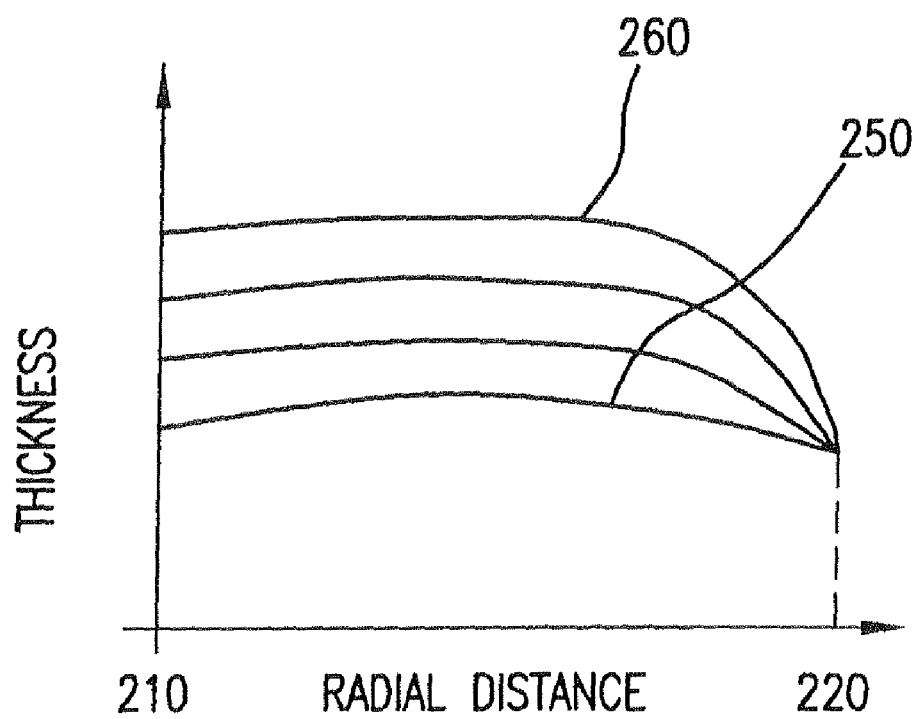
FIG. 3 is a plot showing lens thickness in various zones of a lens according to one embodiment of the present invention.

FIG. 3 depicts the thickness profile within zone 2 of the carrier. The horizontal axis represents the radial distance from the junction of the transition zone and the carrier 230 to the lens edge 220. In this embodiment, the maximum thickness was located at the border E and the minimum thickness was at the border 250. At each angular meridian, there is a relatively consistent thickness section, i.e., the thickness changes less than or equal to about 10% of the maximum thickness. The width of the section may be at least 30% of the carrier zone width and preferred 50% of the carrier zone width. The thickness of zone 2 is preferably used to stabilize the lens.

Figure 4A:
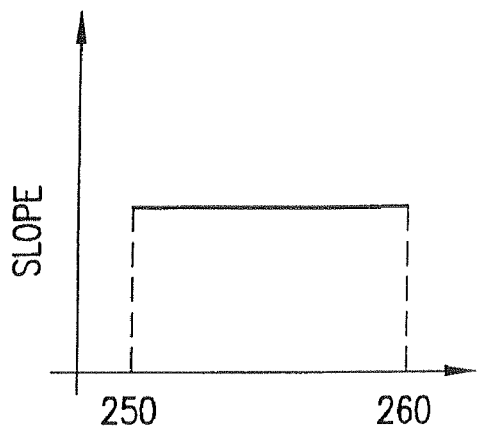
FIG. 4A is a plot that depicts the thickness profile slope in zone 2 according to one embodiment of the present invention.
Figure 4B:
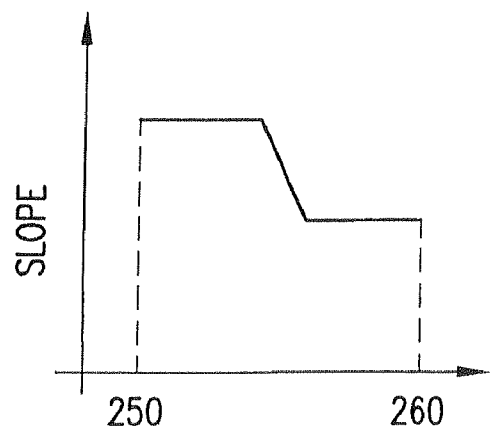
FIG. 4B is a plot that depicts the thickness profile slope in zone 2 according to one embodiment of the present invention.
Figure 4C:
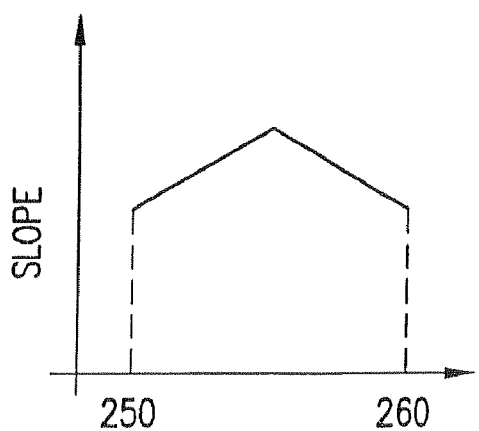
FIG. 4C is a plot that depicts the thickness profile slope in zone 2 according to one embodiment of the present invention.

FIG. 4 represents plots of thickness profile slope in zone 2 for various embodiments of the present invention. For example, in an embodiment depicted by FIG. 4A, the slope of the thickness profile may remain constant. In an embodiment depicted by FIG. 4B, the slope of the thickness profile may be similar to a step-type function. In an embodiment depicted by FIG. 4C, the slope may increase and decrease, reaching a maximum between boundaries 250 and 260.

Figure 5B:
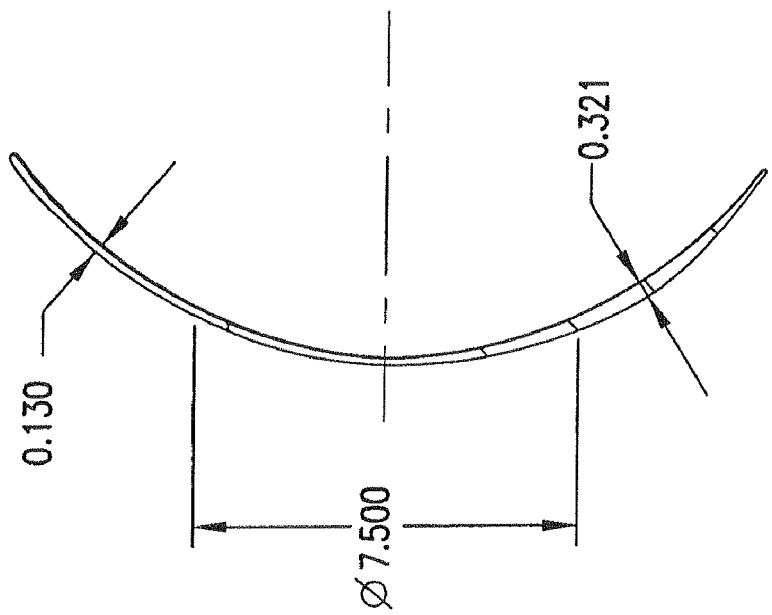
FIG. 5B is a side view of a lens depicted in FIG. 5A.

FIG. 5 maps angular slices taken from a lens produced from one embodiment of the design of the present invention in various views. FIG. 5B represents a section of the lens taken at the vertical meridian. Notably, the lens has a prism-type ballast that is similar to a conventional prism ballast toric lens. In the embodiment depicted in FIG. 5B, the maximum thickness may be approximately 0.321 mm. In one embodiment the thickness may reach a maximum along boundary 260

Figure 5A:
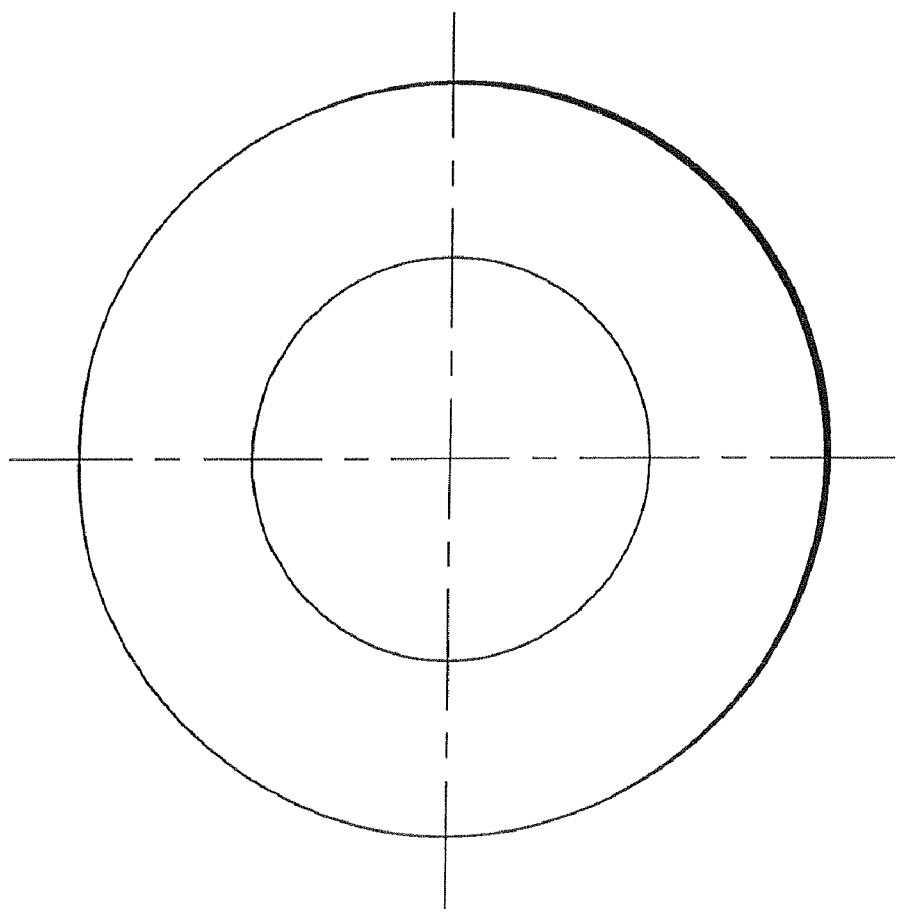
FIG. 5A is a top view of a lens according to one embodiment of the present invention sectioned for horizontal slicing.
Figure 6B:
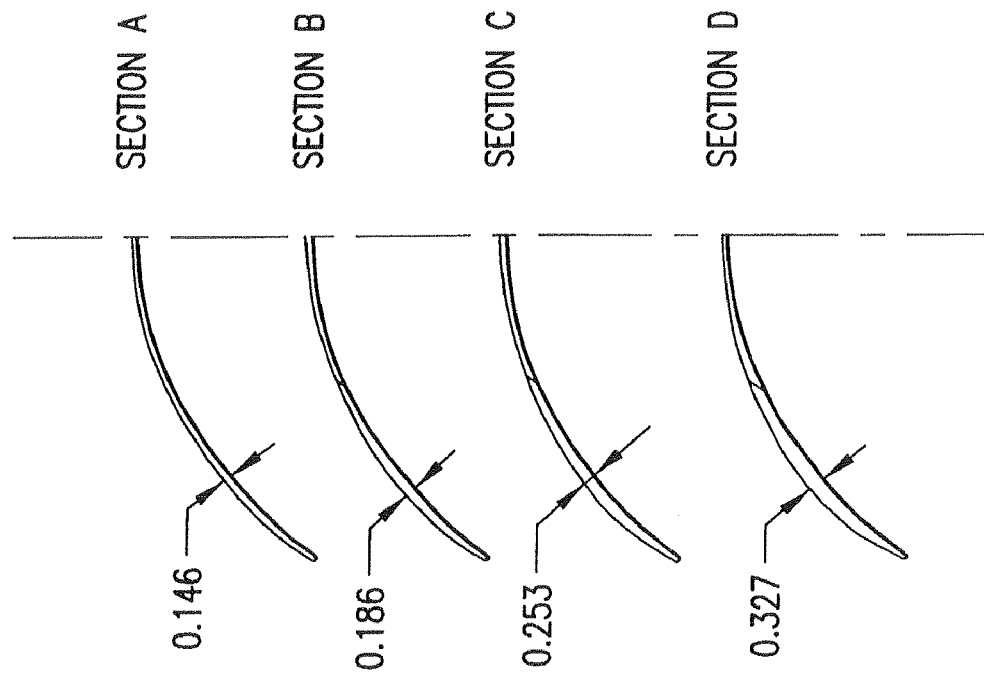
FIG. 6 depicts slices of the lens of FIG. 5A
Figure 6A:
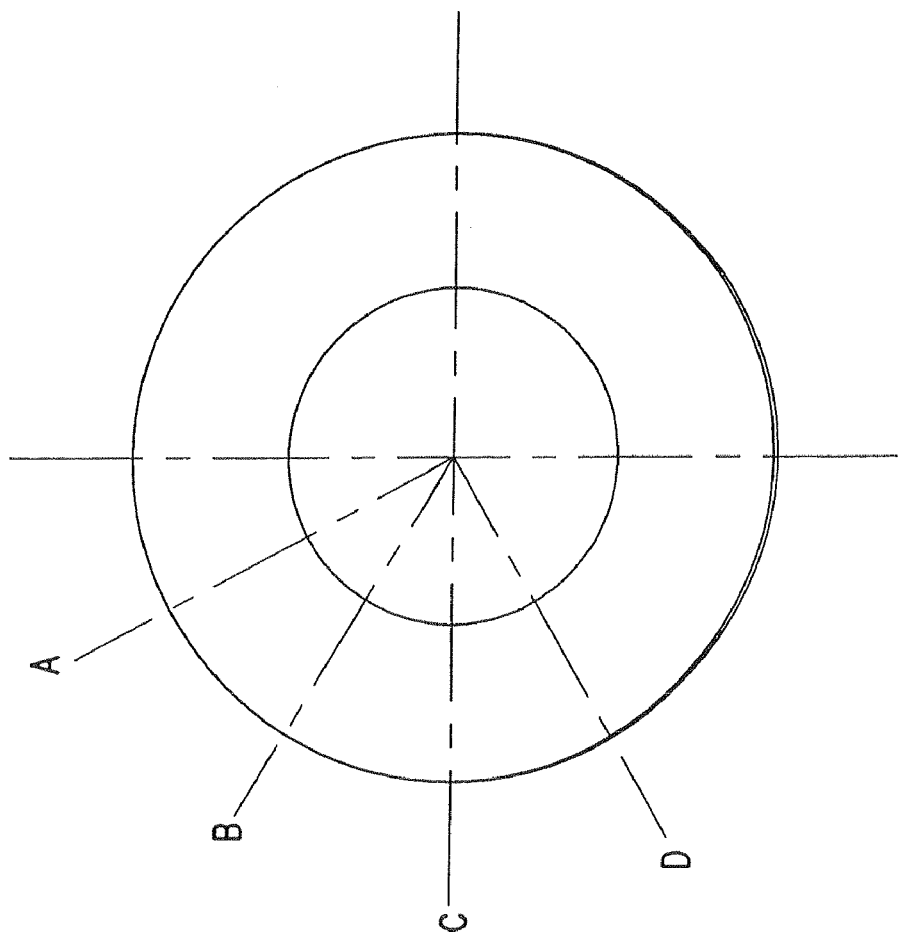

FIG. 6 shows individual slices taken from the lens shown in FIG. 5A. The thickness is preferably greatest in zones 2&3. The sections in FIG. 6 are radial sections to better reflect the preference that the lens be thickest along the border between zones 2&3. Although FIGS. 5 and 6 contain dimensions, these dimensions are exemplary only and are not meant to be limiting.

The changes in thickness that create rotational stability may form a geometric thickness pattern that is annular in shape. This ring preferably has an open end towards the top of a lens, where the thickness is preferably minimal. In this embodiment, the annular geometry begins along the boundary between zones 1 and 2 and continues down through zone 3. The ring preferably has a width of relatively consistent thickness, i.e., the thickness changes less than or equal to about 10% of the maximum thickness at the angular meridian. The annular width region is preferably about 1.5 mm wide in zones 2&3 along angular meridians.

Another parameter that may be used to define the boundaries of the annular region is the percentage of a zone occupied by the annular region. In a preferred embodiment, the width of annular region may occupy at least 30 percent of zone 2. Unless stated otherwise the thickness is measured normal from the posterior surface to the anterior surface. Additionally, all distances are measured along the curved surface rather than planar projections of the lens.

The present design may be used for various powers. In some embodiments, the thickness profiles of the carrier zones are consistent irrespective of the power used. In other words, the same carrier may be used although the optical zone differs. Additionally, the first derivative is preferably continuous on the entire front surface, thus eliminating junctions between zones and areas. This feature may provide greater comfort to the user.

Any known, suitable optical computer aided design (CAD) system may be used to design an optical model lens, including the carrier zones. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

After completing a desired design, a toric contact lens can be produced in a computer-controlled manufacturing system. The lens design can be converted into a data file containing control signals that is interpretably by a computer-controlled manufacturing device. A computer-controlled manufacturing device is a device that can be controlled by a computer system and that is capable of producing directly an ophthalmic lens or an optical tool for producing an ophthalmic lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform ultra-precision lathes (models 30, 40, 50 and 80) having Variform piezoceramic fast tool servo attachment.

Toric contact lenses of the invention may be produced by any convenient means, for example, such as lathing and molding. Preferably, toric contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lens of the invention using a suitable liquid lens-forming material placed between the molds followed by compression and curing of the lens-forming material.

Toric contact lenses of the invention can be either hard or soft lenses. Soft toric contact lenses of the invention are preferably made from a soft contact lens material, such as a silicon hydro-gel or HEMA. It will be understood that any lens described above comprising any soft contact lens material would fall within the scope of the invention.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A toric contact lens design comprising a central optical zone, a vertical meridian, a transition zone surrounding said central optical zone, and a carrier extending from said transition zone outward and having three thickness zones in said carrier, wherein the thickness zones are designed to achieve rotational stability, wherein said thickness zones are symmetrical across the vertical meridian on the sides of said lens design, wherein the slope of the thickness profile of the second zone is a linear function, wherein the thickness profile is measured along angular meridians radiating from the central optical zone, and wherein the thickness change along each of the second zone angular meridians is equal to or less than 10% of the maximum thickness of the meridian.

2. The design of claim 1, wherein the boundary between the first zone and second zone is between about 15 degrees from the vertical meridian and about 45 degrees from the vertical meridian.

3. The design of claim 1, wherein the boundary between the third zone and second zone is between about 30 degrees from the vertical meridian and about 60 degrees from the vertical meridian.

4. The design of claim 1, wherein there is a relatively consistent thickness section at each angular meridian in zones one and two.

5. The design of claim 1, wherein a thickness range from the upper boundary to the lower boundary of the second zone is between about 0.065 mm to about 0.45 mm.

6. The lens created by claim 1.

7. The design of claim 1, further comprising a second transition zone at the edge of the lens.

8. A toric contact lens design comprising a central optical zone, a vertical meridian, a transition zone surrounding said central optical zone, a carrier extending from said transition zone outward and three thickness zones in said carrier, wherein the thickness zones are designed to achieve rotational stability, wherein said thickness zones are symmetrical across the vertical meridian on the sides of said lens design, wherein the slope of the thickness profile of the second zone gradually increases and subsequently decreases from the upper boundary to the lower boundary, wherein the thickness profile is measured along angular meridians radiating from the central optical zone, and wherein the thickness change along each of the second zone angular meridians is equal to or less than 10% of the maximum thickness of the meridian.

9. The design of claim 8, wherein the boundary between the first zone and second zone is between about 15 degrees from the vertical meridian and about 45 degrees from the vertical meridian.

10. The design of claim 8, wherein the boundary between the third zone and second zone is between about 30 degrees from the vertical meridian and about 60 degrees from the vertical meridian.

11. The design of claim 8, wherein there is a relatively consistent thickness section at each angular meridian in zones one and two.

12. The design of claim 8, wherein a thickness range from the upper boundary to the lower boundary of the second zone is between about 0.065 mm to about 0.45 mm.

13. The lens created by claim 8.

14. The design of claim 8, further comprising a second transition zone at the edge of the lens.

15. A toric contact lens design comprising a central optical zone, a vertical meridian, a transition zone surrounding said central optical zone, a carrier extending from said transition zone outward and a plurality of thickness zones in said carrier, wherein the thickness zones are designed to achieve rotational stability, wherein said thickness zones are symmetrical across the vertical meridian on the sides of said lens design, wherein width of a relatively consistent thickness is at least 30% of the zone width, wherein the thickness profile is measured along angular meridians radiating from the central optical zone, and wherein the thickness change along each of the second zone angular meridians is equal to or less than 10% of the maximum thickness of the meridian.

16. The design of claim 15, wherein said plurality of said thickness zones further comprises three thickness zones.

17. The design of claim 16, wherein the boundary between the first zone and second zone is between about 15 degrees from the vertical meridian and about 45 degrees from the vertical meridian.

18. The design of claim 16, wherein the boundary between the third zone and second zone is between about 30 degrees from the vertical meridian and about 60 degrees from the vertical meridian.

19. The design of claim 16, wherein there is a relatively consistent thickness section at each angular meridian in zones one and two.

20. The design of claim 16, wherein a thickness range from the upper boundary to the lower boundary of the second zone is between about 0.065 mm to about 0.45 mm.

21. The lens created by claim 15.

22. The design of claim 15, further comprising a second transition zone at the edge of the lens.

23. A toric contact lens design comprising a central optical zone, a carrier extending from said central optical zone outward and three thickness zones in said carrier, wherein the thickness zones are designed to achieve rotational stability, wherein the slope of the thickness profile of the second zone is a linear function, wherein the thickness profile is measured along angular meridians radiating from the central optical zone, and wherein the thickness change along each of the angular meridians in a second thickness zone is equal to or less than 10% of the maximum thickness of the meridian.

24. The design of claim 23, wherein the boundary between the first and second zone is between about 15 degrees from the vertical meridian and about 45 degrees from the vertical meridian.

25. The design of claim 23, wherein the boundary between the third zone and second zone is between about 30 degrees from the vertical meridian and about 60 degrees from the vertical meridian.

26. The design of claim 23, wherein a thickness range from the upper boundary to the lower boundary of the second zone is about 0.065 mm to about 0.45 mm.

27. The design of claim 23, wherein there is a relatively consistent thickness section at each angular meridian in zones one and two.

28. The lens created by claim 23.

29. The design of claim 23, further comprising a transition zone at the edge of the lens.

30. A toric contact lens design comprising a central optical zone, a carrier extending from said central optical zone outward and three thickness zones in said carrier, wherein the thickness zones are designed to achieve rotational stability, wherein the slope of the thickness profile of the second zone gradually increases and subsequently decreases from the upper boundary to the lower boundary, wherein the thickness profile is measured along angular meridians radiating from the central optical zone, and wherein the thickness change along each of the second zone angular meridians is equal to or less than 10% of the maximum thickness of the meridian.

31. The design of claim 30, wherein the boundary between the first and second zone is between about 15 degrees from the vertical meridian and about 45 degrees from the vertical meridian.

32. The design of claim 30, wherein the boundary between the third zone and second zone is between about 30 degrees from the vertical meridian and about 60 degrees from the vertical meridian.

33. The design of claim 30, wherein there is a relatively consistent thickness section at each angular meridian in zones one and two.

34. The design of claim 30, wherein a thickness range from the upper boundary to the lower boundary of the second zone is about 0.065 mm to about 0.45 mm.

35. The lens created by claim 30.

36. The design of claim 30, further comprising a transition zone at the edge of the lens.

37. A toric contact lens design comprising a central optical zone, a carrier extending from said central optical zone outward and a plurality of thickness zones in said carrier, wherein the thickness zones are designed to achieve rotational stability, wherein width of a relatively consistent thickness is at least 30% of the zone width, wherein the thickness profile is measured along angular meridians radiating from the central optical zone, and wherein the thickness change along each of the angular meridians in a second zone is equal to or less than 10% of the maximum thickness of the meridian.

38. The design of claim 37, wherein said plurality of said thickness zones further comprises three thickness zones.

39. The design of claim 38, wherein the boundary between the first zone and second zone is between about 15 degrees from the vertical meridian and about 45 degrees from the vertical meridian.

40. The design of claim 38, wherein the boundary between the third zone and second zone is between about 30 degrees from the vertical meridian and about 60 degrees from the vertical meridian.

41. The design of claim 38, wherein there is a relatively consistent thickness section at each angular meridian in zones one and two.

42. The design of claim 38, wherein a thickness range from the upper boundary to the lower boundary of the second zone is between about 0.065 mm to about 0.45 mm.

43. The lens created by claim 37.

44. The design of claim 37, further comprising a second transition zone at the edge of the lens.

* * * * *